United States Patent
Rodi et al.

[11] 3,754,797
[45] Aug. 28, 1973

[54] SKID CONTROL SYSTEM

[75] Inventors: Anton Rodi, Karlsruhe; Heinz Leiber, Leimen; Wolf-Dieter Jonner, Heidelberg-Boxberg; Wolfgang Korasiak, Ketsch, all of Germany

[73] Assignee: Teldix G.m.b.H., Heidelberg, Germany

[22] Filed: Nov. 12, 1971

[21] Appl. No.: 198,336

[30] Foreign Application Priority Data
Dec. 28, 1970 Germany.................. P 20 63 944.5

[52] U.S. Cl. ......................... 303/21 BE, 188/181 C
[51] Int. Cl. ............................................. B60t 8/08
[58] Field of Search................... 188/181 C; 303/20, 303/21; 317/5; 324/160–161; 340/52 R, 263

[56] References Cited
UNITED STATES PATENTS

| | | | |
|---|---|---|---|
| 3,650,575 | 3/1972 | Okamoto | 303/21 BE UX |
| 3,652,135 | 3/1972 | Baumann | 303/21 CF |
| 3,556,610 | 1/1971 | Leiber | 303/21 P |
| 3,582,152 | 6/1971 | Burckhardt et al. | 303/21 EB |
| 3,635,530 | 1/1972 | Packer et al. | 303/21 P |
| 3,637,264 | 1/1972 | Leiber et al. | 303/21 BE |

Primary Examiner—Milton Buchler
Assistant Examiner—Stephen G. Kunin
Attorney—Spencer & Kaye

[57] ABSTRACT

An antilocking control system for controlling brake pressure in a vehicle. A first reference signal generator and a second reference signal generator are provided. The two reference signal generators each develops a separate reference signal which approximates in its time sequence the speed of the vehicle. The second reference signal is lower in value than the first reference signal. A wheel speed sensor is provided for supplying a signal which corresponds to wheel speed. The signal which corresponds to wheel speed is compared alternatingly with the two reference signals in a comparison circuit which develops, as its output, a control signal. A valve arrangement responsive to the control signal controls fluid pressure.

20 Claims, 4 Drawing Figures

Patented Aug. 28, 1973

3,754,797

SKID CONTROL SYSTEM

BACKGROUND OF THE INVENTION

This invention relates to a control system operating according to the principle of speed comparison. More particularly, the present invention relates to an antilocking control system in which an electrical upper reference signal, which in its time sequence is approximated to the speed of a vehicle, as well as an electrical signal directly analogous to the rotational speed of a braked wheel are used to control brake pressure.

Control systems which are based on an electrical comparison of a speed related reference signal with a signal directly related to the rotational speed and which reduce the pressure when the rotational speed signal falls below the reference signal are known in a number of different embodiments. Such control systems are often called slip controllers.

The differences between these known control systems exist principally in the different techniques of determining the rotational speed of the braked wheel (converted to the peripheral speed) and the speed of the vehicle. Tachogenerators are known, for example, as rotational speed sensors for the braked wheel, as are electrical pulse generators whose pulses have a pulse distance inversely proportional to the rotational speed and which ususally are converted by means of pulse repetition rate-to-voltage converters to a direct voltage which is proportional to the rotational speed.

The prior art regarding the determination of the vehicle speed is even more diverse. The simplest systems utilize an unbraked wheel and measure its rotational speed, which is thus an accurate indication of the vehicle speed. Other known systems measure the vehicle deceleration and attempt to obtain a continuous indication of the vehicle speed by integration of this measure of deceleration. Still other systems derive an average signal from the rotational speeds of all braked wheels of the vehicle or select the momentarily highest rotational speed signal and use this average signal or this selected speed signal as the reference signal representing the vehicle speed. These last-mentioned systems, however, no longer function when all of the wheels are locked.

It is also known to obtain the reference signal which represents an approximation of the vehicle speed from the speed of one or a plurality of braked wheels in that their speed at the moment of the occurrence of a greater deceleration is stored in a memory device which discharges slowly. If the rotational speed of the respective wheel increases again toward the end of the control cycle to a value higher than indicated at that moment by the memory device, then the memory device is recharged again.

It has been found, however, that even with the relatively accurate ways of producing a reference signal which approximates the speed of the vehicle, the brake control as a whole operates unsatisfactorily because the control amplitudes of the wheel speed are too high. As a result, the vehicle not only becomes unsteady and strong undesirable vibrations occur at the wheel suspension, but also reduction of the braking path and lateral guidance are not obtained to the desired degree. The simple reason for this is that the very narrow range of the speed of the wheel over which the road contact of the wheel is best is passed through too quickly.

It is an object of the present invention to provide an antilocking control system in a vehicle which permits low control amplitudes for wheel speed.

It is another object of the present invention to provide an antilocking control system in a vehicle which keeps the speed of a wheel in an optimum range during a large portion of the total braking period.

It is a further object of the present invention to provide an antilocking control system in a vehicle which reduces otherwise strong and undesirable vibrations at the wheel suspension of the vehicle.

It is an additional object of the present invention to provide an antilocking control system in a vehicle which reduces the braking path.

It is yet another object of the present invention to provide an antilocking control system in a vehicle which effects a high degree of lateral guidance.

These objects, as well as others which will become apparent from the following discussion, are achieved according to the present invention of an antilocking control system by the provision of two reference signal generators each of which develops a separate reference signal which approximates in its time sequence the speed of a vehicle. The second reference signal is lower in value than the first reference signal. A wheel speed sensor is provided for developing a signal which corresponds to wheel speed. A comparison circuit is provided in which the two reference signals are alternatingly compared with the signal which corresponds to wheel speed. The comparison circuit supplies, as its output, a control signal which is used to control a valve arrangement which in turn determines fluid pressure.

In the antilocking control system according to the present invention, two reference signals are provided which are both substantially approximated to the time sequence of the vehicle speed, whose value is different, however, and which are both less than the electrical signal equivalent of the vehicle speed. They may be formed in that different, predetermined signal values corresponding to difference speeds are subtracted from the signal corresponding directly to vehicle speed or that the signal corresponding directly to the vehicle speed is reduced, in each case, on a different percentage basis. In preferred embodiments, which will be described in more detail below, the upper reference signal is approximately 95 percent and the lower reference signal is approximately 80 percent of a selected and smoothed signal directly related to the peripheral speed of a braked wheel which in this case can be considered as a duplication of the vehicle speed.

A feature of one embodiment of the present invention is that, due to continuously produced switching signals, the reference signals are continuously caused to change, i.e. a signal corresponding to the speed of the wheel is continuously compared alternatingly with the one or the other reference signal. As long as the signal corresponding to the speed of the wheel is lower than the then compared reference signal, a comparator generates a control signal. This control signal actuates a pressure control device such as a three-way valve which, in the operating position, lowers the pressure and, in the rest position, increases the pressure. If thus the signal corresponding to the speed of the wheel is above the level of the higher reference signal indicating that the speed of the wheel is above an upper reference value, the pressure is continuously increased. If the signal corresponding to the speed of the wheel lies between the two reference signals, a comparison signal is generated only during the comparison with the upper reference signal because the signal corresponding to the speed of the wheel is less than the upper reference signal and more than the lower reference signal. With the appropriate dimensioning of the pulse duration/pulse interval ratio of the switching signals it is possible to maintain the average brake pressure in this intermediate range. If the speed of the wheel drops sufficiently resulting in a signal which is below the lower reference signal, however, then the pressure is continuously reduced so that re-acceleration of the wheel is the result.

It may happen, of course, that at the moment when the speed of the wheel falls sufficiently that the resulting signal is below the upper reference signal — and this is the decisive moment — the comparison with the lower reference signal happens to be taking place. It would be desirable, however, to initiate the pressure reduction at this particular moment. For this reason, an improvement of the present invention is that the signal corresponding to the speed of the wheel is initially compared in any case with the upper reference signal and the periodic switching signals are generated only when the signal corresponding to the speed of the wheel is less than the upper reference signal. Thus the switching circuit in its normal state is set so that the upper reference signal appears at the comparison circuit. The comparison circuit output is connected with the switching circuit via a timing circuit which is delayed, as to its actuation and deactuation, and whose output signal effects a switching to the lower reference signal.

As a further improvement of the control behavior it is proposed to have available a third reference signal which corresponds, for example, to 97 percent of the signal representing vehicle speed and to design the switching circuit so that the comparison of the wheel speed with this reference value takes place as a result of a special signal. It is particularly advisable to switch to the third reference signal as long as the wheel is decelerated to a certain extent, i.e. as long as a specially provided delay signal generator responds. Thus it is possible to detect even earlier the necessity for pressure reduction at the onset of the braking process.

In this respect it is proposed to compare the signal corresponding to the wheel speed initially with the lower reference signal and beginning with the second control cycle to produce periodic switching signals over a limited period of time. These switching signals have superimposed on them, in certain operational circumstances, acceleration and deceleration signals which have priority. The acceleration signal (the first such signal is referred to here, a second one will be discussed later) keeps the pressure constant. The deceleration signal reduces the pressure. Thus the comparison signal, after having initiated the control process, is effective only, starting with the second cycle, when the acceleration and deceleration signals are not present. Under this condition and in cooperation with a pulse generator the pressure is increased in stages in the range of the wheel speed extending above an upper reference value which corresponds to the upper reference signal. The pressure is reduced in stages in the range between the upper reference value and a lower reference value, which corresponds to the lower reference signal, and is continuously decreased in the range below the lower reference value. The term "in stages" means that periods of unchanging fluid pressure or gradual fluid pressure changes alternate with periods of rapid pressure changes.

The following features of the system according to the present invention appear to be of particular significance both individually and in combination. The switching circuit is set in its normal state so that the lower reference signal appears at the comparison circuit. The deceleration and/or acceleration signal generator effects a switching to the upper reference signal when the rotational deceleration and/or acceleration of the braked wheel exceeds appropriate predetermined threshold values. If, however, no acceleration or deceleration signal is present, a pulse generator effects a switching of the reference signals. However, this pulse generator does not operate continuously, but only until it receives a control signal. This control signal is produced by means of a special switching arrangement beginning with the second control cycle when the deceleration signal appears and is extended by a delayed-deactuation timing member. If the pressure control device comprises, as it may, a normally closed outlet valve and a normally open inlet valve, the inlet valve is connected with the above-mentioned signal generators via logic switching circuits in such a manner that it is closed during the presence of the deceleration signal, the acceleration signal, the comparison signal and/or during the pulse intervals of the above-mentioned pulse generator. The outlet valve is connected with the signal generators, via logic circuits, in such a manner that it is open during the presence of the deceleration signal starting with the second control cycle and/or during the presence of a comparison signal unless the acceleration signal is present at the same time.

If a pressure control device is employed as the pressure controller which is constructed differently, for example a magnetic valve having more than two positions, the last-mentioned requirements for the actuation of the outlet valve correspond to a pressure reduction and the requirements for the actuation of the inlet valve correspond to a keeping constant of the pressure, except for those cases when the pressure is being reduced. During the rest of the time and with all other signal combinations the brake pressure may rise or is subject to the will of the driver, respectively. Keeping constant includes an increase with a slight, definitely slower increase in the speed of the pressure rise.

In this system, as in many others, it is advantageous for the acceleration signal generator to be so designed that it emits a second acceleration signal when the wheel acceleration exceeds a second, higher threshold value and that this signal opens the inlet valve with priority or quite generally lets the brake pressure increase rapidly and with priority.

It has already been mentioned that the pulse duration/pulse interval ratio of the pulse generator which actuates the switching circuit can be changed in dependence on time. This is preferably accomplished in that the delayed-deactuation timing circuit which controls the pulse generator is constructed with an electrical capacitor and that with increasing capacitor discharge the pulses from the timing circuit become longer compared to the intervals. This is important because with the absence of acceleration and deceleration signals the pulse generator alone determines the pressure sequence insofar as the speed of the braked wheel lies between the reference values or above the upper reference value.

DESCRIPTION OF THE PREFERRED EMBODIMENTS

Figure 1:
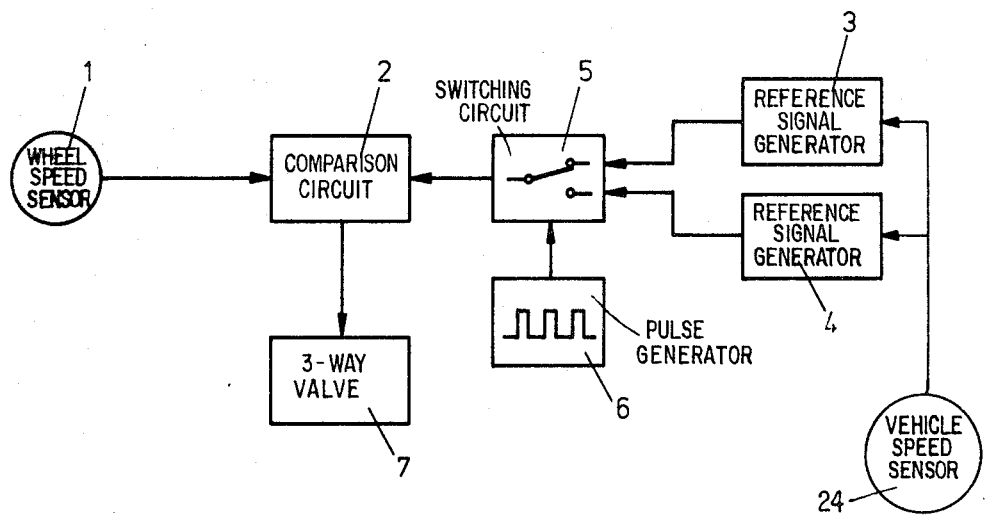
FIG. 1 is a block circuit diagram of an antilocking control system according to the present invention involving continuous switching of two reference signals and with a three-way valve as the pressure control device.

Referring to FIG. 1 a control system according to a first embodiment of the present invention includes a wheel speed sensor 1 which senses wheel speed and produces an electric output signal analogous to the rotational speed of the wheel. The output signal from the wheel sensor 1 is fed to a comparison circuit 2. Two reference signal generators 3 and 4 are provided. The reference signal generator 3 receives an input signal from a vehicle speed sensor 24 and furnishes an upper reference signal. The reference signal generator 4 also receives an input from the vehicle speed sensor 24 and produces a lower reference signal. The two reference signals are fed to a switching circuit 5 which, in its normal position, feeds the upper reference signal to a comparison circuit 2 and, upon the occurrence of a switching signal, the lower reference signal instead. The upper and lower reference signals from the reference generators 3 and 4 are approximated in their time sequence to the speed of the vehicle, thus approximately correspond to it. The reference signal generators 3 and 4 are calibrated regarding the analogue of speed expressed by them in the same unit of measure as the calibration of the wheel speed sensor 1. It should be noted, however, that the two reference signals developed in the reference generators 3 and 4 both are lower than a true analogue signal corresponding exactly with the speed of the vehicle. The upper reference signal is approximately 95 percent and the lower reference signal approximately 80 percent of a smoothed signal from the vehicle speed sensor 24 which would correspond approximately to the averaged speed of at least one brake-controlled other wheel. It will be appreciated that the vehicle speed sensor 24 need not be of the type which senses the speed of one other brake-controlled wheel, but may take other forms including those forms mentioned in the introductory part of this specification.

A free-running pulse generator 6 continuously furnishes switching pulses to the switching circuit 5. When the signal corresponding to wheel speed furnished by the wheel speed sensor 1 is less than either reference signal furnished by the switching circuit 5 to a comparison circuit 2, the comparison circuit 2 produces a comparison signal which is fed to a three-way fluid valve, generally designated by the numeral 7. The control is effected in such a manner that at the presence of the comparison signal from the comparison circuit 2 the brake pressure drops, in the absence of the comparison signal, however, it rises. The dimensioning of the pulses from the pulse generator 6 in relation to the pulse intervals depends on the average pressure reduction speed and pressure increase speed and must take place in such a way that the average brake pressure remains constant.

The following mode of operation results for the antilocking control system illustrated in FIG. 1. The switching circuit 5 switches continuously back and forth due to the pulses coming from the free-running pulse generator 6. As long as the wheel to which the wheel speed sensor 1 is attached continues to roll unbraked its output signal, which is an analogue of speed, is higher in any case than the two reference signals supplied from the switching circuit 5. Thus, the comparison circuit 2 produces no comparison signal and the brake pressure can increase without interference upon the onset of the braking process. The stronger the pressure, the more the wheel is decelerated and sooner or later the analogue signal, corresponding to wheel speed, will become lower than the upper reference signal. If the switching circuit 5 should switch to this upper reference signal or if it has already done so, the comparison circuit 2 produces a comparison signal. The three-way valve 7 switches, in response to the comparison signal, and the pressure drops. As long as the analogue signal corresponding to wheel speed has not fallen below the lower reference signal, the comparison signal from the comparison circuit 2 is interrupted when the switching circuit 5 is switched to the lower reference signal. In this speed range there thus occurs alternatingly a drop and a rise of pressure which, as already mentioned, remains on the average approximately constant due to the setting of free-running pulse generator 6. Only when the analogue signal corresponding to speed of the wheel has dropped below the lower reference signal, will the pressure be decreased continuously. When the wheel speed increases again, the procedure takes place in the opposite order.

Figure 2:
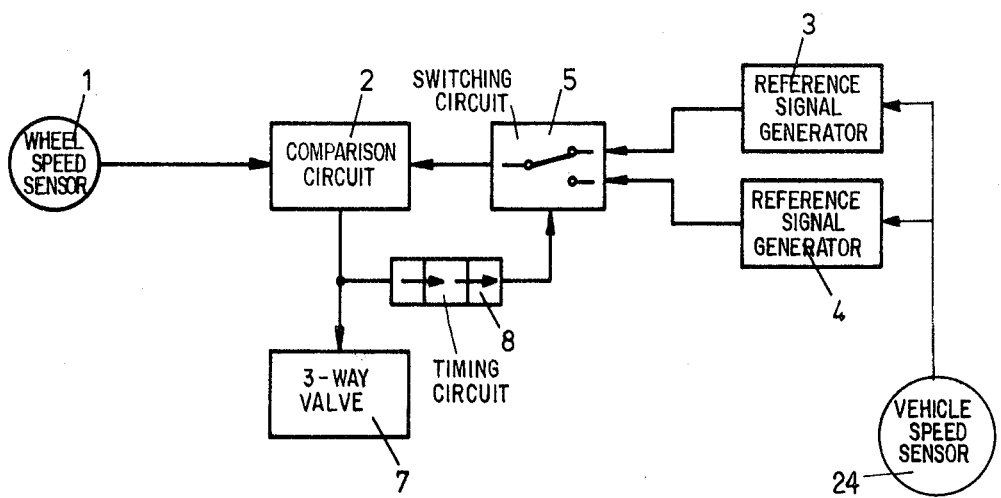
FIG. 2 is a block circuit diagram of a second embodiment of an antilocking control system similar to that of FIG. 1 but involving switching of reference signals only after a signal corresponding to the speed of the wheel falls below the higher reference signal.

The control system according to a second embodiment of the present invention illustrated in FIG. 2 differs from that of FIG. 1 essentially in that a delayed-actuation and deactuation timing circuit 8 is provided which furnishes switching signals for a switching circuit 5 instead of the pulse generator 6 (FIG. 1). Such delayed-actuation and deactuation timing circuits are part of the prior art. Such timing circuits act in such a way that an output signal, figured from the beginning of an input signal, appears only after a certain time interval and appears only when the input signal has continued during the entire time interval. From the time the input signal ends, the output signal also ends after a certain time interval. The two time intervals may be identical or different.

This kind of representation of such a timing circuit is known for instance from "Deutsche Normen DIN 40 700 Blatt 14", page 3, number 4.4. That means that different examples for such circuits are known.

The switching device 5, in the system of FIG. 2, must normally take the position shown in the drawing in which the upper reference signal from a reference signal generator 3 is fed to a comparison circuit 2. The timing circuit 8 is connected to the output of the comparison circuit 2 and its output signal constitutes a switching signal which switches the switching circuit 5 to the lower reference signal as long as it itself is present.

With the antilocking control system shown in FIG. 2 it has been accomplished that the pressure, which is determined by a three-way valve 7, will be reduced immediately in any case as soon as the analogue signal from a wheel speed sensor 1, which corresponds to wheel speed, falls below the upper reference signal. If it is now assumed that the wheel speed initially remains in the intermediate range, then the output signal of the timing circuit 8 will appear after a certain period of time so that now the lower reference signal will be fed to the comparison circuit 7 and thus the comparison signal ends at once. The pressure now increases until the timing circuit 8 has run down, that is when the second time interval ends, whereupon the switching circuit 5 is switched again to the upper reference signal. Thus periodic switching pulses and periodic pressure fluctuations are produced.

Only when the analogue signal, which corresponds to the wheel speed, from the wheel speed sensor 1 has dropped also below the lower reference signal, the periodic sequence ends and this is done in that during switching to the lower reference signal the signal from the comparison circuit 2 is not interrupted. Consequently, the lower reference signal now remains continuously effective. When the analogue signal, corresponding to wheel speed, from the wheel speed sensor 1 again rises to a higher value, the output signal from the comparison circuit 2 is interrupted and the periodic sequence starts again. Finally, when the speed of the wheel rises sufficiently for the wheel speed sensor 1 to produce an output signal which rises beyond the upper reference signal, the switching process is again terminated and the pressure increases continuously.

In addition to the operative advantages the antilocking control system of FIG. 2 impresses most of all by its high operating dependability and simplicity which is provided by the use of the delayed action timing circuit 8. Such timing circuits are robust and well known to persons skilled in the art as variable interval types as well as with any desired fixed interval.

The control system of FIG. 2 is conceived particularly as a dependent control system for driven wheels of vehicles, the reference signals being obtained in some instances preferably from the wheel speeds of autonomously controlled undriven wheels.

Figure 3:
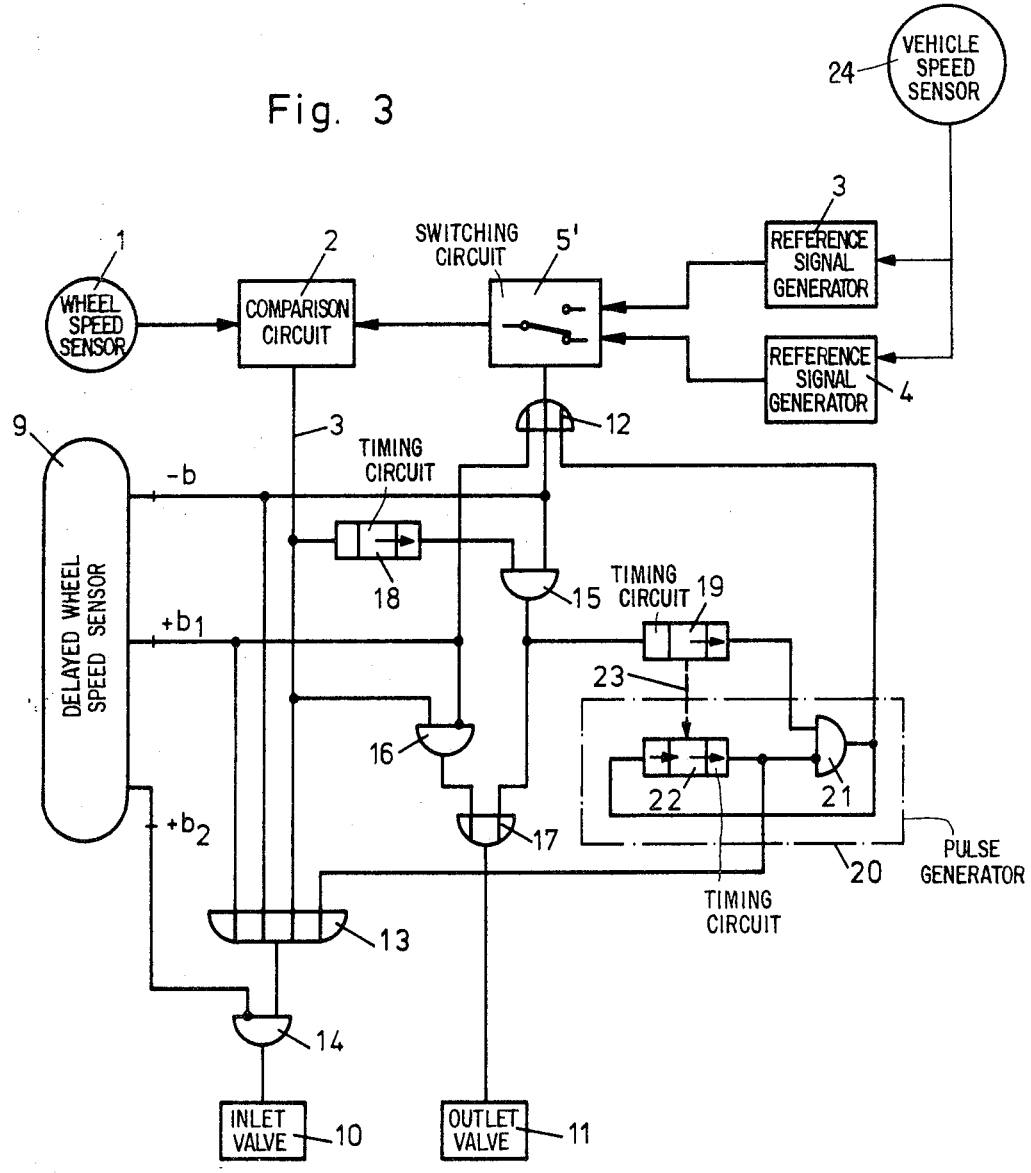
FIG. 3 is a block circuit diagram of a third embodiment of an antilocking control system according to the present invention involving logic circuits, an acceleration and deceleration sensor, and a wheel speed sensor.

Referring to FIG. 3, a control system according to a third embodiment of the present invention is illustrated, the system has been refined to such an extent that the speed of the braked wheel itself may be obtained by a wheel speed sensor to form reference signals. Particularly when the speeds of two individually controlled wheels are used of which the higher speed is selected each time, smoothing or memory circuits will be able to produce a very good image of the vehicle speed. This then results in the upper and lower reference signals in two reference signal generators 3 and 4. This process, however, is not a particular aim of the present invention and therefore is not discussed in detail. A switching circuit 5' used in the embodiment of FIG. 3 has a different basic setting when compared with the switching circuits of FIGS. 1 and 2. Here, the lower reference signal from the reference signal generator 4 is normally fed to a comparison circuit 2. This comparison circuit 2 produces a comparison signal at its output in a manner described above.

In addition to a wheel speed sensor 1, a known wheel acceleration and deceleration sensor 9 is provided. The wheel speed sensor 9 is designed to provide three outputs. Firstly, sensor 9 provides a signal $-b$ which appears whenever the rotational deceleration is greater than a given acceleration threshold value. Secondly, the sensor 9 provides an acceleration signal $+b_1$ which appears whenever the rotational acceleration is greater than a given acceleration threshold value. Thirdly, the sensor 9 provides an acceleration signal $+b_2$ which additionally appears whenever the rotational acceleration is greater than a second higher given acceleration threshold value. The detailed structure of the sensor 9 is not of interest for the present invention. It may include one or more rotational masses which are spring supported and actuate contacts. It may be constructed on an electronic basis and produce the respective signals by differentiation of the speed dependent electrical value provided directly from the wheel speed sensor 1 and with the aid of threshold value amplifiers or the like. It may also be constructed to include a wheel speed sensor or a plurality of sensors which are separate from the wheel speed sensor 1.

The deceleration signal $-b$ and the acceleration signal $+b_1$ which will first be discussed, serve a dual purpose. These signals effect the switching of the switching circuit 5' to the upper reference signal and they influence a pressure control arrangement which as illustrated in FIG. 3, includes a normally open fluid inlet valve 10 and a normally closed fluid outlet valve 11. However, the present invention is not limited to the use of this fluid pressure control arrangement. Rather, any other pressure control arrangement can be used which is responsive to control signals and is controlled in a similar manner. To control the switching circuit 5', the signals $-b$ and $+b_1$ from the delayed wheel speed sensor 9 are connected with the switching circuit 5' via separate inputs of a three-input OR circuit 12. To control the inlet valve 10 the signals $-b$ and $+b_1$ are fed through separate inputs of a four-input OR circuit 13 to a two-input NAND circuit 14. To control the outlet valve 11 the $-b$ signal is applied to one input of a two-input AND circuit 15, and the $+b_1$ signal is applied to the negated input of a two-input circuit 16. The outputs of the NAND circuit 16 and the AND circuit 15 are led to a two-input OR circuit 17 which, in turn supplies a signal to control the outlet valve 11.

The output of a comparison circuit 2, which receives input signals from the wheel speed sensor 1 and the switching circuit 5', is coupled to the inlet valve 10 via the OR circuit 13 and the NAND circuit 14, and with the outlet valve 11 to the NAND circuit 16 and the OR circuit 17.

The second input of the AND circuit 15 is connected with the output of the comparison circuit 2 via a delayed-deactuation timing circuit 18 having the same construction essentially as the timing circuit 8 (FIG. 2). The time delay provided by the timing circuit 18 is approximately 400 milliseconds. From the first occurrence of the comparison signal from the comparison circuit 2 the AND circuit 15 will be open practically continuously for the signal $-b$ until the end of the braking process. It can be said that normally the control process begins with the first occurrence of the comparison signal from the comparison circuit 2. The AND circuit 15 thus, as this is expressed in a simplified manner in the introduction to the present specification, permits the $-b$ signal to pass beginning with the second control cycle.

A pulse generator 20 is controlled by a further delayed-deactuation timing circuit 19, which is also set to approximately 400 milliseconds from the output of the AND circuit 15, the pulse generator 20 being shown as a dot-dashed box. It comprises a NAND circuit 21 and a delayed action timing circuit 22. The control signal from timing circuit 19 passes to the normal input of a NAND circuit 21. Its output forms one output of the pulse generator 20. It is externally connected with the switching circuit 5' via the OR circuit 2 and internally connected with the timing circuit 22. Its output again leads to the negated input of the NAND circuit 21 and simultaneously constitutes the second output of pulse generator 20. It also controls the inlet valve 10 via the fourth input of the OR circuit 13.

At the negated input of the NAND circuit 14 the third output of the sensor 9 is connected which provides the second acceleration signal $+b_2$.

It should finally be mentioned that the delayed-deactuation timing circuit 19 is connected in such a manner, shown diagrammatically by the dashed line 23, that the emitted pulses become longer and longer compared to the pulse intervals as time goes on.

With the aid of the graphs of FIG. 4 the operation of the control system of FIG. 3 will be explained in detail.

Figure 4:
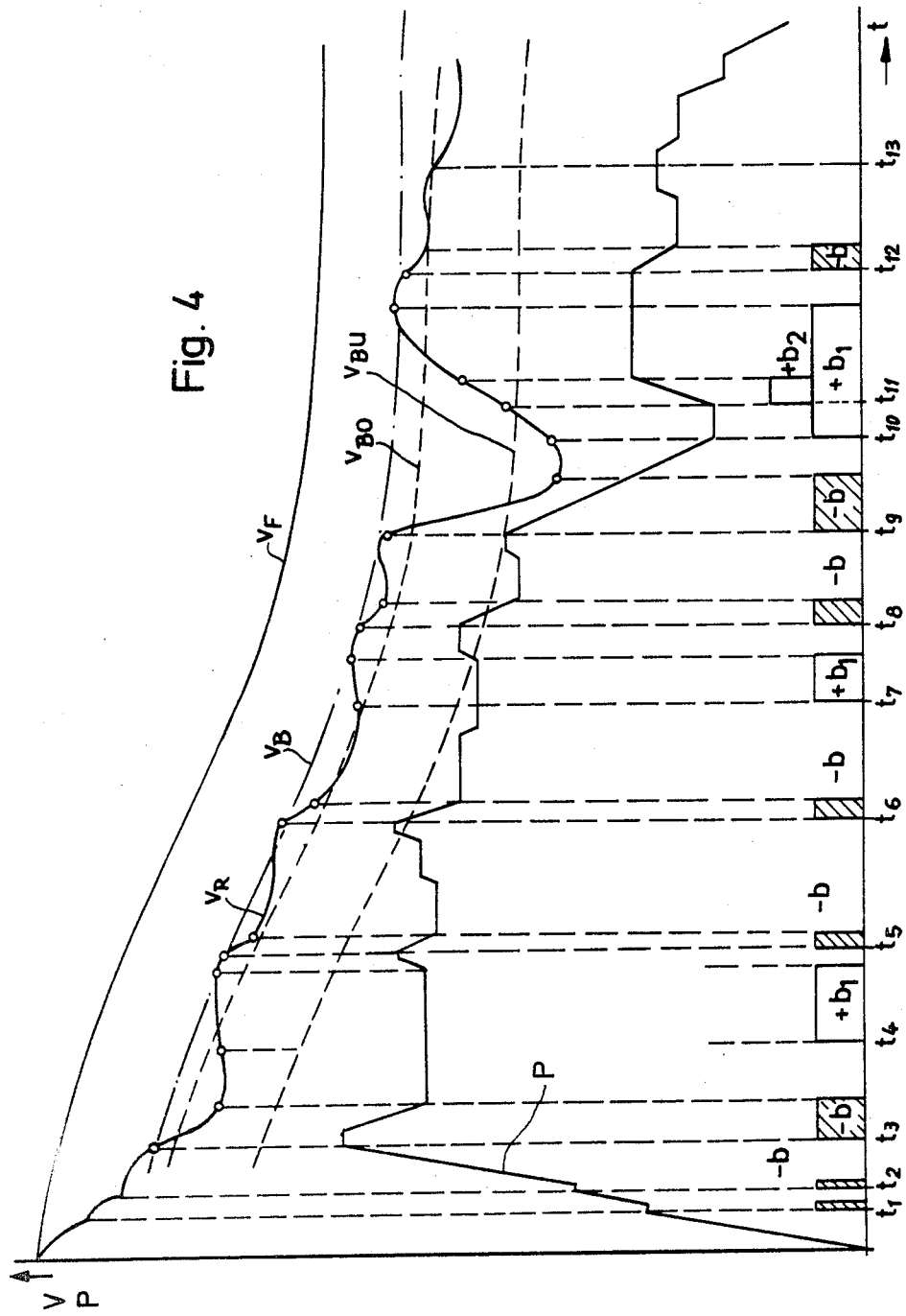
FIG. 4 shows a group of graphs illustrating an exemplary sequence of the vehicle speed, the wheel speed and the brake pressure during a control process in the system of FIG. 3.

FIG. 4 shows an exemplary sequence of the vehicle speeds as $V_F$, the approximated vehicle speed, shown in a dot-dashed line, as $V_B$. The two comparison thresholds, which correspond to the two reference signals, derived therefrom, are shown in dashed lines (e.g. 95 and 80 percent of $V_B$) marked respectively $V_{Bo}$ and $V_{Bu}$.

While the sequences shown in FIG. 4 are constructed in order to illustrate as many control variations as possible, it is to be understood that the control sequence as shown does not illustrate every possible sequence which may be encountered in practice.

The sequence curve of the wheel speed is designated $V_R$ and the sequence curve of the brake pressure is designated P. The signals which are supplied from the sensor 9 are marked respectively as $-b$ and $+b_1$ and $+b_2$.

Considering first the initiation of control with the lower reference signal, in the unbraked state the inlet valve 10 is open and the outlet valve 11 is closed so that the brake pressure can rise without interference. The rather rare but critical case, insofar as deceleration-dependent control systems are concerned, where the speed of the wheel drops so slowly that no deceleration signal is produced will first be considered. The control, in this instance, is initiated by the comparison signal, from the comparison circuit 2, when the reference signal analgous to wheel speed has passed below the lower reference signal $V_{Bu}$, i.e. at 80 percent of the simulated vehicle speed. The inlet valve 10 closes and the outlet valve 11 opens. The pressure drops.

Considering next the initiation of control with the $-b$ signal and the higher reference signal, in which case road conditions are such that a wheel deceleration occurs which causes the delay signal $-b$ to appear from the sensor 9, the inlet valve 10 is first closed, i.e. the pressure kept constant and the switching circuit 5' is simultaneously switched to supply the upper reference signal to the comparison circuit 2. However, the AND circuit 15 blocks the $-b$ signal. The system thus takes up a ready position, i.e. it finds out whether the deceleration of the vehicle is strong enough, or lasts long enough, respectively, that the analogue signal from the wheel speed sensor 1, corresponding to the speed of the wheel drops to 95 percent of the signal corresponding to simulated vehicle speed $V_{Bo}$. If this is not the case, as for the deceleration signals at times $t_1$ and $t_2$ in FIG. 4, the signal is determined to be only a temporary interference signal which was caused possibly not by actuation of the brakes, but only by a pothole in the road or the like. The system, in this case, does not recognize it, and the pressure continues to increase and the switching circuit 5' switches back to the lower reference signal from the reference signal generator 4.

If, on the other hand, at the presence of the $-b$ signal, the signal corresponding to simulated vehicle speed of the wheel falls below the upper reference value $V_{Bo}$, as for the deceleration signal (FIG. 4) occurring at time $t_3$, a comparison signal appears from the comparison circuit 2 so that the outlet valve 11 is opened via the NAND circuit 16 and the OR circuit 17 and the pressure is reduced.

As a further result, the timing circuit 18 is actuated. Thus, the $-b$ signal passes via the AND circuit 15 to the timing circuit 19 and also actuates it so that the pulse generator 20 now starts to operate.

When the signal from timing circuit 19 arrives at the input of the NAND circuit 21, it simultaneously also appears at its output as the first output signal from the pulse generator 20 and returns to the input of the timing circuit 22. Its response time is set from about 10 to about 80 milliseconds. After this interval, the output signal of the timing circuit 22 appears. It passes to the negated input of the NAND circuit 21 and simultaneously forms the second output signal of pulse generator 20. With its appearance, the first output signal of the NAND circuit 21 ends because the NAND circuit 21 blocks. The second output signal continues until the end of the reactuation time of the timing circuit 22, which lies in the order of magnitude of from about 10 to about 80 milliseconds. Then the first output signal appears again and so on until finally timing circuit 19 has run down, which, however, does not occur during a normal control process because of the frequent reactivation by the $-b$ signal from the sensor 9 supplied via the AND circuit 15.

The above-described operation of pulse generator 20 alternatingly effects the switching by the switching circuit 5' to the upper reference signal during the first output signal condition, pulses from the NAND circuit 21, and the closing of the inlet valve 11 during the second output signal condition, absence of pulses from the NAND circuit 21.

In the case control is provided in the intermediate range without the $-b$ and $+b$ signals from the sensor 9, it is noted that as long as the $-b$ signal is present, the upper reference signal is decisive, thus in this case the operation of the pulse generator 20 exerts no influence. If now the $-b$ signal ends, the control system is switched back, by the comparison circuit 2, to the lower reference signal $V_{Bu}$, where it now matters whether the speed of the wheel is still in the intermediate range or has fallen below the lower reference value corresponding to the reference signal $V_{Bu}$.

If the speed of the wheel is still in the intermediate range, as assumed at the end of the deceleration signal which begins at $t_3$ in FIG. 4, the comparison ends with the switching over by the switching circuit 5'. This also terminates the reduction in pressure. Since, however, the pulse generator 20 is operating, the inlet valve 10 is closed alternatingly via the second output of the pulse generator 20 and the pressure kept constant or the system is switched with the first output of the NAND circuit 21 acting on the switching circuit 5' via the OR circuit 12, to the upper reference signal $V_{Bo}$ and the pressure is lowered by means of the comparison signal from the comparison circuit 2. The pulse generator 20 thus effects a step-wise pressure reduction in this situation. Such a pressure reduction is shown in FIG. 4 following the deceleration signal beginning at $t_6$ and from $t_{13}$ on.

Considering control in the lower range, it is to be noted, that at the completion of the $-b$ signal from the sensor 9 and with resulting switching back to the lower reference signal $V_{Bu}$ by the switching circuit 5' the speed of the wheel lies below a value which would produce a signal having the value of the lower reference signal. The comparison signal from the comparison circuit 2 remains in effect and the pressure continues to drop until the acceleration signal $+b_1$ from the sensor 9 appears. This is shown in FIG. 4 following the deceleration signal beginning at $t_9$. This signal first effects a switching by the switching circuit 5' to the upper reference signal. It further completes, with the aid of the NAND circuit 16, the pressure reduction and keeps the inlet valve 10 closed via the OR circuit 13 and the pressure constant. (See the $+b$ signal starting at $t_{10}$, and also from $t_4$ to $t_7$).

The reacceleration phase now follows. Principally, the pressure remains constant until the end of the acceleration signal $+b_1$. If the reacceleration becomes particularly strong, however, the second acceleration signal $+b_2$ may appear once or several times which signal blocks the signal flow and opens the inlet valve 10 so that the pressure can increase. This is shown in FIG. 4 starting at $t_{11}$.

It may happen, however, that the reacceleration takes place extremely slowly so that the acceleration signal $+b_1$ is not produced. In this case the control system is switched by the switching circuit 5' again to the lower reference signal $V_{Bu}$. As long as the speed of the wheel moves sufficiently low so the wheel speed sensor 1 does not produce a signal at least as large as the lower reference signal, the comparison signal from the comparison circuit 2 remains and the pressure drops. If the speed of the wheel reaches the intermediate range, however, the pulse generator 20 again takes command and reduces the pressure in stages.

Considering control in the upper range, it is to be noted that the speed of the wheel nevertheless grows and the wheel speed sensor 1 produces a signal above the upper reference signal $V_{Bo}$ the influence of pulse generator 20, if it is still operating, is reversed. The first output signal, in spite of switching by the switching circuit 5' to the upper reference signal, is unable to produce a comparison signal from the comparison circuit 2. Thus, the pressure increases under these conditions. Seen as a whole this results in a step-type pressure build up, as shown in FIG. 4 after the signal starting at $t_{12}$, as well as after the signals beginning at $t_4$ and $t_5$ as well as $t_7$. After the timing circuit 19 fails to provide an output, its delay function having been completed, an uninterrupted pressure build up follows, if a new cycle has not been started in the meantime.

The setting of the timing circuits may depend on any desired operating parameters. The connection shown by dashed line 23 in FIG. 3 indicates functionally that during the interval in which the timing circuit 19 supplies an output signal, the response time of the timing circuit 22 is extended, for example, from about 7 to about 20 milliseconds and the deactuation time, for example, is shortened from about 50 to about 10 milliseconds. In addition, the response time of timing circuit 22 may be influenced by the comparison signal. Thus it has been found to be advantageous in a control system used in practice to expand the above-mentioned range of adjustment of from about 20 to about 7 milliseconds, while maintaining the above-mentioned dependence, to from about 80 to about 7 milliseconds if a comparison signal is present.

The representation of timing circuit 19 is also known from "Deutsche Normen DIN 40 700, Blatt 14", page 3, No. 4.3. Consequently corresponding circuits are also known. The timing circuit 22 corresponds to the timing circuit 8 in FIG. 2 except that the two time periods of this circuits are varied. In practice the two periods (response time and deactuation time) of the circuit 22 are determined by two RC-members (resistance-capacity members) the time constants of which are varied in different directions by means of the voltage of the discharging capacitor in time circuit 19. This can be realised by varying the resistances of the two RC-members in different directions.

The antilocking control system according to the present invention exhibits a degree of adaptivity never before attained to rapidly changing roadway surfaces. This adaptivity is, in the final result, the reason for the extremely low control amplitudes and thus the high quality of the control.

It will be understood that the above description of the present invention is susceptible to various modifications, changes and adaptations and the same are intended to be comprehended within the meaning and range of equivalents of the appended claims. Thus it is possible to use two comparison circuits instead of one to feed the signal representative of the rotational speed to both comparison circuits and also to feed one reference signal to each comparison circuit. In this example the switching circuit effects either that a comparison is done alternatively only in one comparison means, or that the signals at the outputs of the comparison means are alternatively coupled to the signal responsive means.

We claim:

1. In an antilocking control system having a first means for developing a first electrical reference signal which corresponds in its time sequence to the speed of a vehicle, means for developing an electrical signal which is an electrical representation of the rotational speed of a braked wheel of said vehicle, and signal-responsive means for controlling brake pressure, the improvement comprising:

a. second means for developing a second electrical reference signal which corresponds in its time sequence to the speed of such vehicle and is lower in value than said first electrical reference signal;

b. comparison means having 1. first input means for receiving said electrical signal which is an electrical representation of the rotational speed of the braked wheel,
2. second input means for receiving said electrical reference signals, and
3. output means for putting out signals for controlling said brake pressure control means; and c. switching and circuit means interconnecting said two input means of said comparison means with said three signal developing means and said output means of said comparison means with said brake pressure control means such that there are applied to the brake pressure control means signals which result from the alternating comparison of the signal which is an electrical representation of the rotational speed of the braked wheel with the two reference signals, whereby said brake pressure control means may be actuated when said rotational speed of said wheel is lower than respective reference values corresponding alternatingly to said first electrical reference signal and to said second electrical reference signal.

2. The improved antilocking control system as defined in claim 1 wherein two input means of the switching means are connected to the two said means for developing the electrical reference signals, and the output means of the switching means is connected to the second input means of the comparison means for alternatingly coupling one reference signal to the comparison means.

3. The improved antilocking control system as defined in claim 2 wherein said switching means has a control input means, and further comprising a free-running pulse generator means having an output means, said control input means of said switching means being coupled to said output means of said pulse generator means.

4. The improved antilocking control system as defined in claim 2 wherein said switching means has a control input means and in a rest position couples said first electrical reference signal to said second input means of said comparison circuit means, and further comprising a pulse producing timing circuit means having an input means and an output means, said input means of said timing circuit means being coupled to said output means of said comparison circuit means and said control input means of said switching means being coupled to said output means of said timing circuit means, whereby said switching circuit means alternatingly couples said first electrical reference signal and said second electrical reference signal to said one input means of said comparison circuit means whenever said comparison circuit means produces a signal indicating said braked wheel speed is less than an upper reference value corresponding to said first electrical reference signal.

5. The antilocking control system as defined in claim 2 wherein said switching means has control input means and in a rest position couples said second electrical reference signal to said second input means of said comparison circuit means, and further comprising means responsive to output from said comparison circuit means for producing switching signal pulses for a limited period of time and means for coupling said switching signal pulses to said control input means of said switching means.

6. The antilocking control system as defined in claim 5 wherein said means for producing switching signal pulses comprise means for producing switching signal pulses having a pulse duration/pulse interval ratio which varies in dependence on time.

7. The antilocking control system as defined in claim 5 further comprising means for developing signals directly related to rate of change in velocity of said braked wheel, and means for coupling said signals directly related to given rate of change in velocity to said control input means of said switching means.

8. The antilocking control system as defined in claim 7 wherein said means for developing signals directly related to rate of change in velocity of said braked wheel comprises means for developing a deceleration signal indicating rotational deceleration is greater than a certain threshold value and for developing an acceleration signal indicating rotational acceleration is greater than a given threshold value.

9. The antilocking control system as defined in claim 8 wherein said means for developing signals directly related to rate of change in velocity includes means for developing an additional acceleration signal indicating rotational acceleration is greater than a given second acceleration threshold value which is greater than the first said given threshold value.

10. The antilocking control system as defined in claim 7 further comprising logic circuit means responsive to said signals directly related to said rate of change in velocity for developing control signals, and means for coupling said control signals to said means for controlling brake pressure.

11. An antilocking control system for controlling brake pressure in a vehicle comprising, in combination:
a. means for producing a first electrical reference signal which approximates in its time sequence the speed of said vehicle;
b. means for producing a second electrical reference signal which approximates in its time sequence the speed of such vehicle and which is lower than said first reference signal;
c. sensing means responsive to the rotational speed of a braked wheel of such vehicle for producing an electrical signal directly corresponding to said rotational speed;
d. comparison means having an output means and two input means for developing an output signal on said output means whenever an input signal applied to one of its input means falls below an input signal applied to the other of its input means, said electrical signal directly corresponding to said rotational speed being coupled to said one input means;
e. signal controlled switching means coupled between each of said means for producing reference signals and said other input means of said comparison means for alternatingly supplying said first reference signal and said second reference signal to said comparison means; and
f. pressure control means responsive to said output signal from said output means of said comparison means for reducing brake pressure upon the occurrence of said output signal.

12. The antilocking control system as defined in claim 11 wherein said signal controlled switching means includes a switching signal input means, and further comprising a pulse generator means for supplying switching signals to said switching signal input means.

13. The antilocking control system as defined in claim 12 wherein said pulse generator means comprises a pulse generator means for producing pulse signals having a variable pulse duration/pulse interval characteristic.

14. The antilocking control system as defined in claim 11 wherein said switching means includes a switching signal input means and in a rest state couples said first reference signal to said other input means of said comparison means, and further comprising a delayed action timing circuit means responsive to said output signal from said output means of said comparison means for supplying switching signals to said switching signal input means to effect switching to said second reference signal.

15. The antilocking control system as defined in claim 11 wherein said switching means includes a switching signal input means an in its rest state couples said second reference signal to said other input means of said comparison means, and further comprising means for sensing rate of change in velocity of said braked wheel for producing signals directing said rate of change in velocity exceeds threshold, and means for coupling said signals indicating said rate of change exceeds threshold to said switching signal input means whereby a switching to said first reference signal is effected when rotational deceleration and/or rotational acceleration of said braked wheel exceed corresponding threshold values.

16. The antilocking control system as defined in claim 15, further including a timing circuit means, and a pulse generator; and wherein said means for sensing rate of change includes means for producing a deceleration signal, said deceleration signal being coupled to said switching signal input means via said timing circuit means and said pulse generator for actuating said switching circuit for a given period beginning upon the occurrence of said deceleration signal.

17. The antilocking control system according to claim 16 wherein said pressure control means include a normally closed outlet valve and a normally open inlet valve and further comprising logic circuit means coupled between said comparison means and said inlet valve, between said pulse generator and said inlet valve and between said means for sensing rate of change and said inlet valve for closing said inlet valve selectively upon the occurrence of a deceleration signal, an acceleration signal, an output from said comparison means and pulse intervals of the pulse generator.

18. The antilocking control system according to claim 17, further comprising additional logic circuit means coupled between said comparison means and said outlet valve and between said means for sensing rate of change and said outlet valve for opening said outlet valve selectively upon the occurrence of an output signal from the comparison circuit in the absence of an acceleration signal and of a deceleration signal after one control cycle.

19. The antilocking control system according to claim 18 wherein said means for sensing rate of change in velocity produces a second acceleration signal in response to said braked wheel acceleration exceeding a second higher threshold value, and further including means for coupling said second acceleration signal to said inlet valve for opening said inlet valve on a priority basis.

20. The antilocking system as defined in claim 19 wherein said timing circuit means comprises a capacitive means which is coupled to said pulse generator for providing that said first referece signal is supplied to said comparison means for intervals which increase as said capacitor means discharges in relation to the intervals said second reference signal is supplied to said comparison means.

* * * * *